US007440691B2

(12) United States Patent
Beniyama et al.

(10) Patent No.: US 7,440,691 B2
(45) Date of Patent: Oct. 21, 2008

(54) 360-° IMAGE PHOTOGRAPHING APPARATUS

(75) Inventors: Fumiko Beniyama, Yokohama (JP); Toshio Moriya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 402 days.

(21) Appl. No.: 11/385,743

(22) Filed: Mar. 22, 2006

(65) Prior Publication Data

US 2007/0053679 A1 Mar. 8, 2007

(30) Foreign Application Priority Data

Sep. 5, 2005 (JP) ............................ 2005-255825

(51) Int. Cl.
*G01B 35/00* (2006.01)
*G01B 41/00* (2006.01)

(52) U.S. Cl. ...................................... 396/325; 396/333

(58) Field of Classification Search ......... 396/322-326, 396/333-334; 345/419, 418; 382/154, 293-295
See application file for complete search history.

(56) References Cited

U.S. PATENT DOCUMENTS

| | | | | |
|---|---|---|---|---|
| 6,263,100 | B1 * | 7/2001 | Oshino et al. | 382/154 |
| 6,608,622 | B1 * | 8/2003 | Katayama et al. | 345/419 |
| 6,803,910 | B2 * | 10/2004 | Pfister et al. | 345/420 |
| 6,917,702 | B2 * | 7/2005 | Beardsley | 382/154 |
| 7,110,593 | B2 * | 9/2006 | Katagiri et al. | 382/154 |
| 2005/0219239 | A1 * | 10/2005 | Mashitani et al. | 345/419 |
| 2006/0082644 | A1 * | 4/2006 | Tsubaki | 348/42 |

FOREIGN PATENT DOCUMENTS

| | | |
|---|---|---|
| JP | 2004-139294 | 5/2004 |
| JP | 2004-264492 | 9/2004 |

* cited by examiner

*Primary Examiner*—Jay M Patidar
(74) *Attorney, Agent, or Firm*—Antonelli, Terry, Stout & Kraus, LLP.

(57) ABSTRACT

A computer includes a photographing unit for photographing every time a turn table is rotated and acquiring images of the photographing target from a plurality of photographing devices; a coordinate-system setting unit for setting a coordinate system; position of an extracted feature point of the photographing target being defined as reference of the coordinate system; a viewpoint-parameter calculation unit for calculating viewpoint parameters on the basis of the coordinate system set by the coordinate-system setting unit and camera parameters such as focal lengths of the photographing devices, the viewpoint parameters including position data of the photographing devices and direction data of the photographing devices are oriented; and a correspondence-data storage unit for storing the images and the viewpoint parameters being made correlated with each other, the images being acquired by the photographing unit, the viewpoint parameters being calculated by the viewpoint-parameter calculation unit.

9 Claims, 8 Drawing Sheets

360-° IMAGE PHOTOGRAPHING APPARATUS

INCORPORATION BY REFERENCE

The present application claims priority from Japanese application JP2005-255825 filed on Sep. 5, 2005, the content of which is hereby incorporated by reference into this application.

BACKGROUND OF THE INVENTION

1. Field of the Invention

The present invention relates to multi-viewpoint image photographing which uses a plurality of cameras.

2. Description of the Related Art

As a technology for displaying a certain target object on a screen in such a manner that this target object can be seen from arbitrary directions, there exists a one which applies CG (Computer Graphics) such as Image Based Rendering.

Also, as a technology for displaying on a screen a target object photographed by a camera, there exists a one relating to the following photographing apparatus (; refer to JP-A-2004-264492): By locating a plurality of cameras within a three-dimensional space, the photographing apparatus makes it possible to photograph a plurality of images of the target object without selecting the place, and simultaneously makes it possible to easily make position adjustments of the plurality of cameras. Moreover, there exists a technology for capturing multi-view still images by using an ordinary portable photographing device and a computer without necessitating special training for use, and rearranging the multi-view still images captured (; refer to JP-A-2004-139294).

SUMMARY OF THE INVENTION

In the above-described technology which applies the CG, it is undoubtedly possible to display the target object as if it were seen from arbitrary directions. In this technology, however, the resultant image displayed is not a one acquired by photographing the target object, i.e., an actually-existing object. This results in a lack of reliability.

Meanwhile, in JP-A-2004-264492, it is undoubtedly possible to display the image acquired by photographing the target object, i.e., the actually-existing object. In this technology, however, the apparatus itself is the considerably large-scaled one. In addition, the number of the viewpoints can be acquired only by the number of the photographing devices. Also, the location of the photographing devices is on a hemispherical surface, and no consideration is given to changing posture of the target object. This makes it difficult to acquire the image which results from looking up at the target object from below.

Moreover, in JP-A-2004-139294, it is undoubtedly possible to acquire the plural-viewpoint still images as follows: Namely, different kinds of markers are set up with an equal spacing, in a circular or elliptic configuration, and on a plane on which the photographing target (i.e., target object) is set up. Then, positions of the markers are detected from the images freely photographed by using the single unit of camera. Next, distances and directions between the camera and the markers are calculated from the position relationship with the markers, thereby acquiring the plural-viewpoint still images. In this technology, however, the marker positions are fixed, and no consideration is given to changing the posture of the target object either. This causes a problem to occur which is basically the same as the one in JP-A-2004-264492.

Namely, in the above-described conventional technologies, it is difficult to acquire the photographing-target image which results from looking at the target object from directions of 360° including the up-and-down direction.

In order to deal with the above-described problem, for example, the following method is conceivable: In the set up of the photographing target, the photographing target is suspended from the ceiling by using something like a piano wire. In this method, however, troublesome tasks will occur. For example, depending on the photographing target, fixing the piano wire thereto is difficult. Also, the piano wire fixed to the photographing target needs to be attached at a high position. Also, in the set up of a camera or cameras, when performing the photographing such that the photographing target is surrounded by a large number of cameras, the apparatus itself becomes a considerably large-scaled one. Accordingly, it becomes troublesome to exercise photographing control over the large number of cameras. In addition thereto, even if the photographing itself has been found to be successful, another camera existing on the facing side turns out to be photographed in the photographed image. This makes it difficult to display the image in which the photographing target alone is extracted.

From the explanation given so far, an object of the present invention is to acquire the images of an actually-existing object which is seen from directions of 360°. Simultaneously, this acquisition is made executable without performing troublesome tasks in the image processing such as set up of the photographing target and set up of cameras.

In order to solve the above-described problem, one of the desirable modes of the present invention is as follows: A computer connected to a plurality of photographing devices and a turn table on which a photographing target is set up, the computer including a turn-table control unit for rotating the turn table on the basis of a rotation angle inputted, a photographing unit for performing a photographing every time the turn table is rotated, and acquiring images of the photographing target from the plurality of photographing devices, a coordinate-system setting unit for setting a coordinate system, position of an extracted feature point of the photographing target being defined as reference of the coordinate system, a viewpoint-parameter calculation unit for calculating viewpoint parameters on the basis of the coordinate system set by the coordinate-system setting unit and camera parameters including focal lengths and set-up positions of the photographing devices, the viewpoint parameters including position data for indicating the position coordinates of the photographing devices and direction data for indicating directions in which the photographing devices are oriented, and a correspondence-data storage unit for storing the images and the viewpoint parameters in a manner of being made correlated with each other, the images being acquired by the photographing unit, the viewpoint parameters being calculated by the viewpoint-parameter calculation unit, wherein the photographing unit photographs a first posture and a second posture of the photographing target, the coordinate-system setting unit setting a first coordinate system in the first posture and a second coordinate system in the second posture, the viewpoint-parameter calculation unit converting viewpoint parameters in the second coordinate system into viewpoint parameters in the first coordinate system on the basis of a difference between the first coordinate system and the second coordinate system.

Other objects, features and advantages of the invention will become apparent from the following description of the embodiments of the invention taken in conjunction with the accompanying drawings.

DETAILED DESCRIPTION OF THE INVENTION

Figure 1:
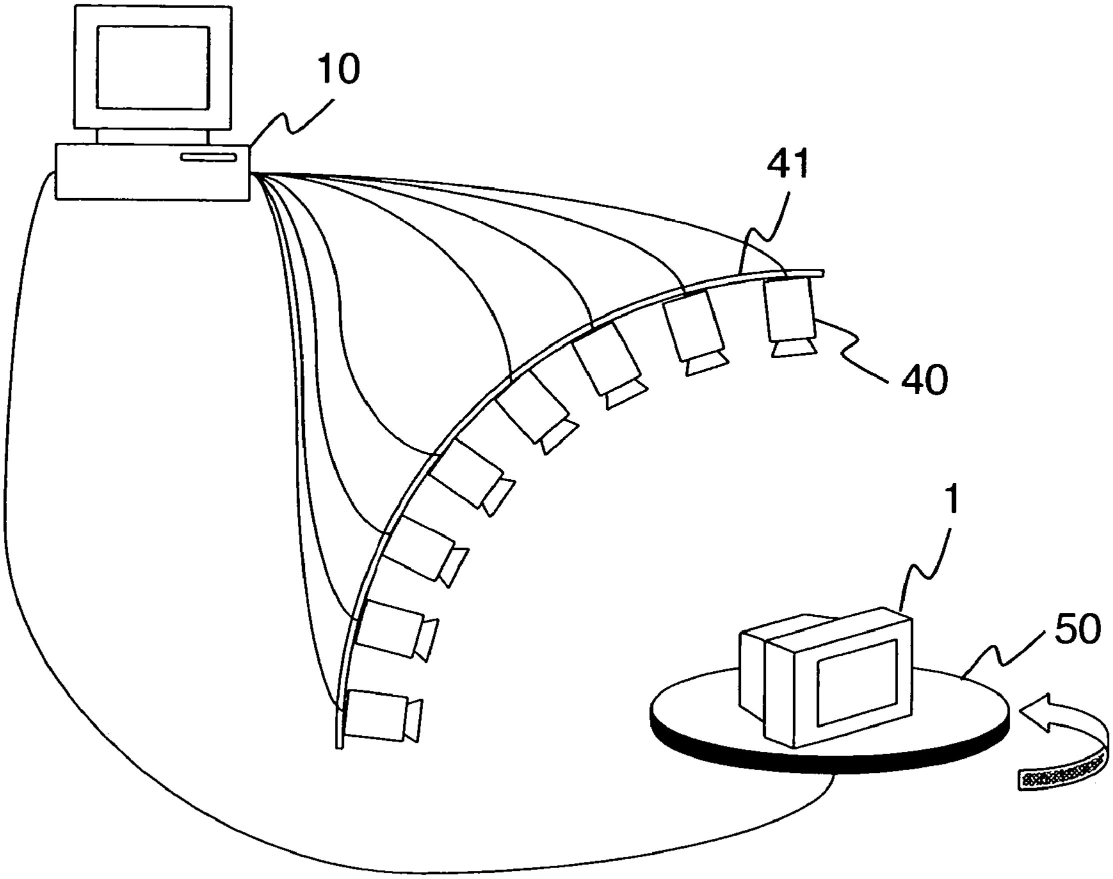
FIG. 1 is a diagram for illustrating the system configuration.

Hereinafter, referring to the drawings, the explanation will be given below concerning an embodiment of the present invention.

FIG. 1 is a diagram for illustrating the system configuration of the present embodiment.

The present system includes a computer 10, a photographing target 1, a turn table 50 which is rotated on each set-angle basis, a plurality of photographing devices 40 for acquiring multi-viewpoint images with the photographing at one time, and an arc-shaped photographing-device set-up table 41 set up along a circle perpendicular to the turn table 50. The computer 10 is connected to each of the plurality of photographing devices 40 and the turn table 50.

In the present system, at first, the photographing target 1 is set up on the turn table 50, then fixing the respective photographing devices 40 to the photographing-device set-up table 41 with an equal spacing set therebetween. The respective photographing devices 40 photograph the photographing target 1 on each set-angle rotation basis of the turn table 50. As a result, horizontal-direction-360-° and vertical-direction-180-° images are acquired at a point-in-time when the turn table 50 has been rotated by 360°. Accordingly, the photographing-device set-up table 41 is formed into an arc of 90°. Also, regarding the position relationship between the photographing-device set-up table 41 and the turn table 50, it is desirable to set up the turn table 50 at the arc center of the photographing-device set-up table 41. This set-up is desirable in order to make constant the distances between the plurality of photographing devices 40 and the photographing target 1, and also in order to make constant the distances between the plurality of photographing devices 40 and the photographing target 1 at an original rotation angle which is restored by rotating the turn table 50 by 360°.

Figure 2:
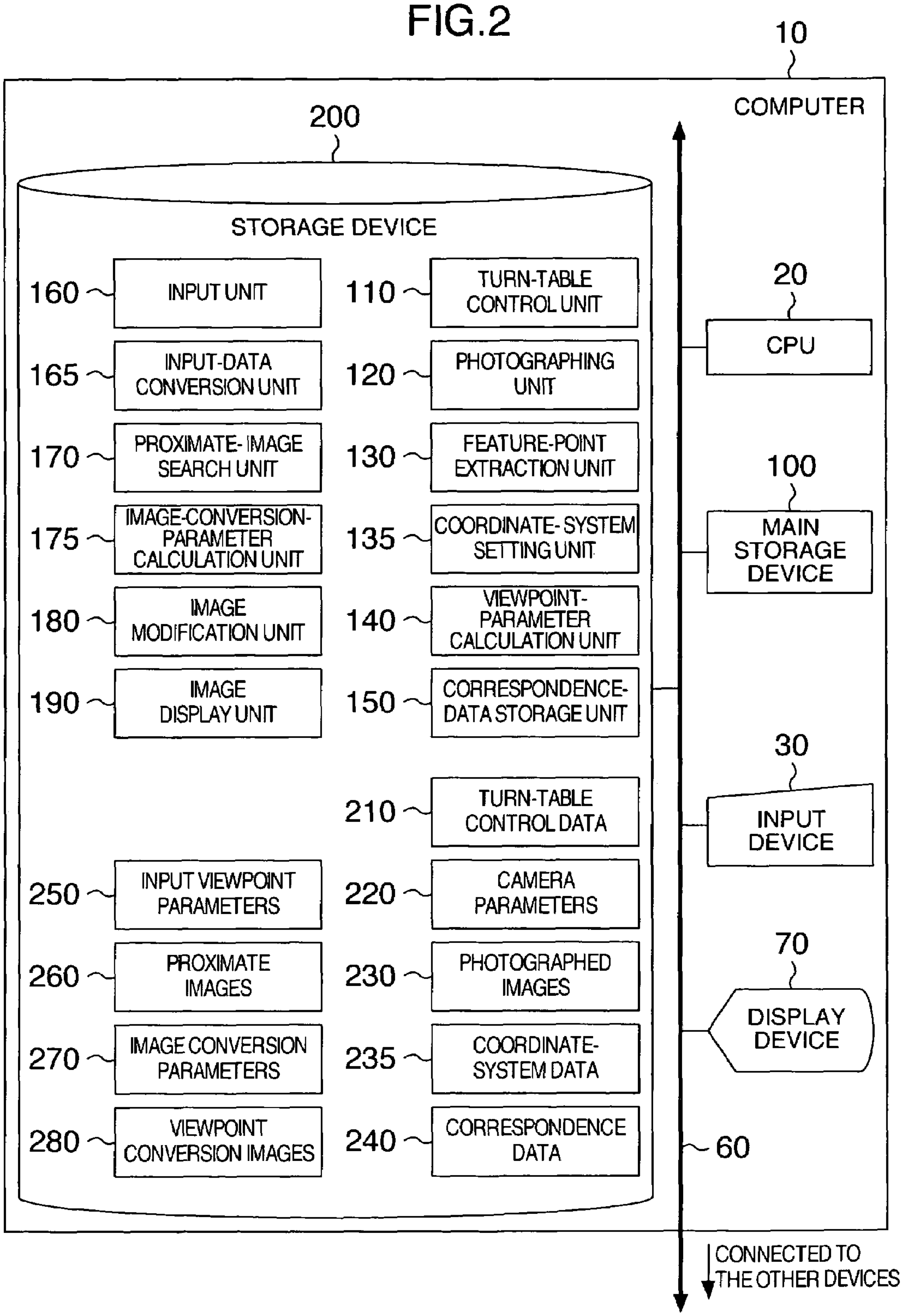
FIG. 2 is a diagram for illustrating hardware configuration of the computer.

FIG. 2 is a diagram for illustrating the hardware configuration of the computer 10.

The computer 10 includes a CPU 20 for performing calculations and controls based on programs, a main storage device 100, a storage device 200 such as hard disc, an input device 30 such as joystick or keyboard, a display device 70, and a bus 60 for connecting these configuration components and the other devices with each other.

The storage device 200 stores therein respective types of programs and data.

A turn-table control unit 110 is a program for controlling the rotation of the turn table 50 in accordance with values of data inputted from the input device 30 (which, hereinafter, will be referred to as "input data") and turn-table control data 210 stored in advance in the storage device 200.

A photographing unit 120 is a program for performing photographing control over the plurality of photographing devices 40, and acquiring photographed images 230.

A feature-point extraction unit 130 is a program for extracting, from the photographed images 230, points which become features on the images, e.g., patterns or corners of the photographing target 1. Incidentally, if the photographing is performed using markers which will be described later, the feature points on the images can be extracted almost automatically. If, however, the photographing is performed without using the markers, the feature points on the images are set by human-handed operation in some cases.

A coordinate-system setting unit 135 is a program for setting a coordinate system (data about the coordinate system will be referred to as "coordinate-system data 235") by selecting, as reference of the coordinate system, position of a feature point extracted by the feature-point extraction unit 130 or the like.

A viewpoint-parameter calculation unit 140 is a program for calculating a viewpoint parameter between the feature-point position of the photographing target 1, which is confirmed from viewpoints of the plurality of different photographing devices 40, and each photographing device 40. Here, the viewpoint parameter refers to existence position of each photographing device 40 and rotation angle of each photographing device 40 in the coordinate system set with the feature point of the photographing target 1 selected as the reference (e.g., an xyz coordinate system with the feature point selected as the point of origin). Here, let the viewpoint parameter be represented by six values: $(x, y, z, \alpha, \beta, \gamma)$, where $(x, y, z)$ and $(\alpha, \beta, \gamma)$ will be referred to as "position data" and "direction data" respectively.

A correspondence-data storage unit 150 is a program for storing and updating the two pieces of data in a manner of being paired with each other (the paired data will be referred to as "correspondence data 240"). Here, the above-described two pieces of data mean the viewpoint parameters calculated by the viewpoint-parameter calculation unit 140 and the photographed images of the photographing target 1 on which the calculation of the viewpoint parameters is eventually based.

An input unit 160 is a program for reading in the input data.

An input-data conversion unit 165 is a program for converting the input data into a viewpoint parameter between each photographing device 40 and the feature point of the photographing target 1. Incidentally, in the present embodiment, in order to make the distinction clearly, the data converted by the input-data conversion unit 165 will be referred to as "input viewpoint parameters 250", while the data which are calculated by the viewpoint-parameter calculation unit 140 and become part of the correspondence data 240 will be referred to as "the viewpoint parameters".

A proximate-image search unit 170 is a program for searching for viewpoint parameters which, of the correspondence data 240, are the most approximate to the input viewpoint parameters 250, and selecting images corresponding thereto, and storing the images as proximate images 260.

An image-conversion-parameter calculation unit 175 is a program for correcting the differences between the input viewpoint parameters 250 and the viewpoint parameters stored in the correspondence data 240.

An image modification unit 180 is a program for modifying the proximate images 260 in response to image conversion parameters 270 calculated, and storing the modified proximate images as viewpoint conversion images 280.

An image display unit 190 is a program for displaying the viewpoint conversion images 280.

The turn-table control data 210 are data for indicating the rotation angles of the turn table 50.

Camera parameters 220 are data for indicating the already-known information such as focal lengths and set-up positions of the photographing devices 40. Incidentally, the focal lengths indicate distances ranging from lenses of the cameras to image planes on which the images are formed. The set-up positions indicate coordinates of set-up positions of the respective cameras on the assumption that all the cameras are fixed and the position relationship among the respective cameras is already known.

The photographed images 230 are data for indicating the images photographed by the plurality of photographing devices 40.

The coordinate-system data 235, the correspondence data 240, and the input viewpoint parameters 250 are the ones exactly explained above.

The proximate images 260 are data for indicating the images which are paired with the viewpoint parameters which, of the viewpoint parameters that are the part of the correspondence data 240, are the most approximate to the input viewpoint parameters 250.

The image conversion parameters 270 are parameters for correcting the differences between the input viewpoint parameters 250 and the viewpoint parameters that are the part of the correspondence data 240.

The viewpoint conversion images 280 are data for indicating the images acquired by modifying the proximate images 260 in response to image conversion parameters 270.

Figure 3:
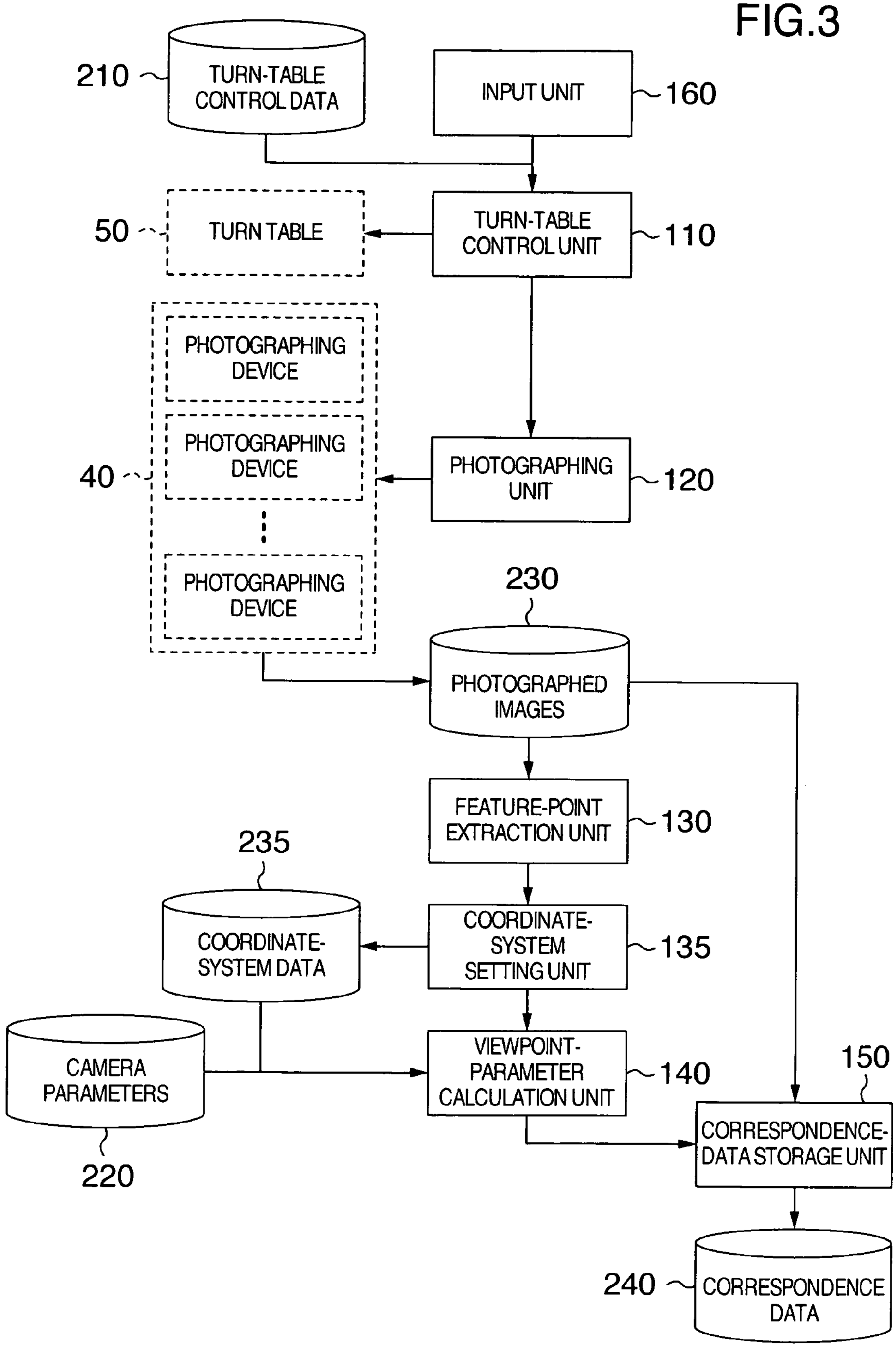
FIG. 3 is a diagram for illustrating function modules at the time of the photographing.

FIG. 3 is a diagram for illustrating function modules at the time of the photographing.

Based on the turn-table control data 210 or the input data (which, here, is a rotation step angle $\phi$ for indicating on what angle basis the turn table 50 will be rotated), in the turn-table control unit 110, the turn table 50 is rotated by $\phi$. Next, in the photographing unit 120, the photographed images 230 photographed by the plurality of photographing devices 40 are stored into the storage device 200. In order to calculate the viewpoint parameters for the photographed images 230, the following operations are performed: Namely, at first, a photographed image 230 which becomes the reference is set arbitrary. Then, a photographed image 230 is acquired by photographing the photographing target 1 by using a photographing device 40 which is positioned at a distance proximate to the photographing device 40 which has photographed the above-described reference photographed image 230. Further, using this photographed image 230 acquired, the feature-point extraction unit 130 extracts, as the feature point, pattern or corner on the photographing target 1 which turns out to be recognized as the same point when the photographing device 40 for photographing the photographing target 1 has been changed. Moreover, based on the above-described feature-point data extracted, the coordinate-system setting unit 135 sets the reference coordinate system for the photographing target 1, thereby creating the coordinate-system data 235. Furthermore, using the principle of stereo, the viewpoint-parameter calculation unit 140 calculates the distance and direction between the photographing device 40 and the feature point, thereby calculating the viewpoint parameter in the above-described set coordinate system 235. This calculation is performed from the already-known parameters such as the camera set-up positions and focal lengths included in the camera parameters 220, and the feature-point position which turns out to be recognized as the same point on the photographed image 230 between the different photographing devices 40. At this time, the correspondence data 240 will be stored and updated sequentially.

Figure 4:
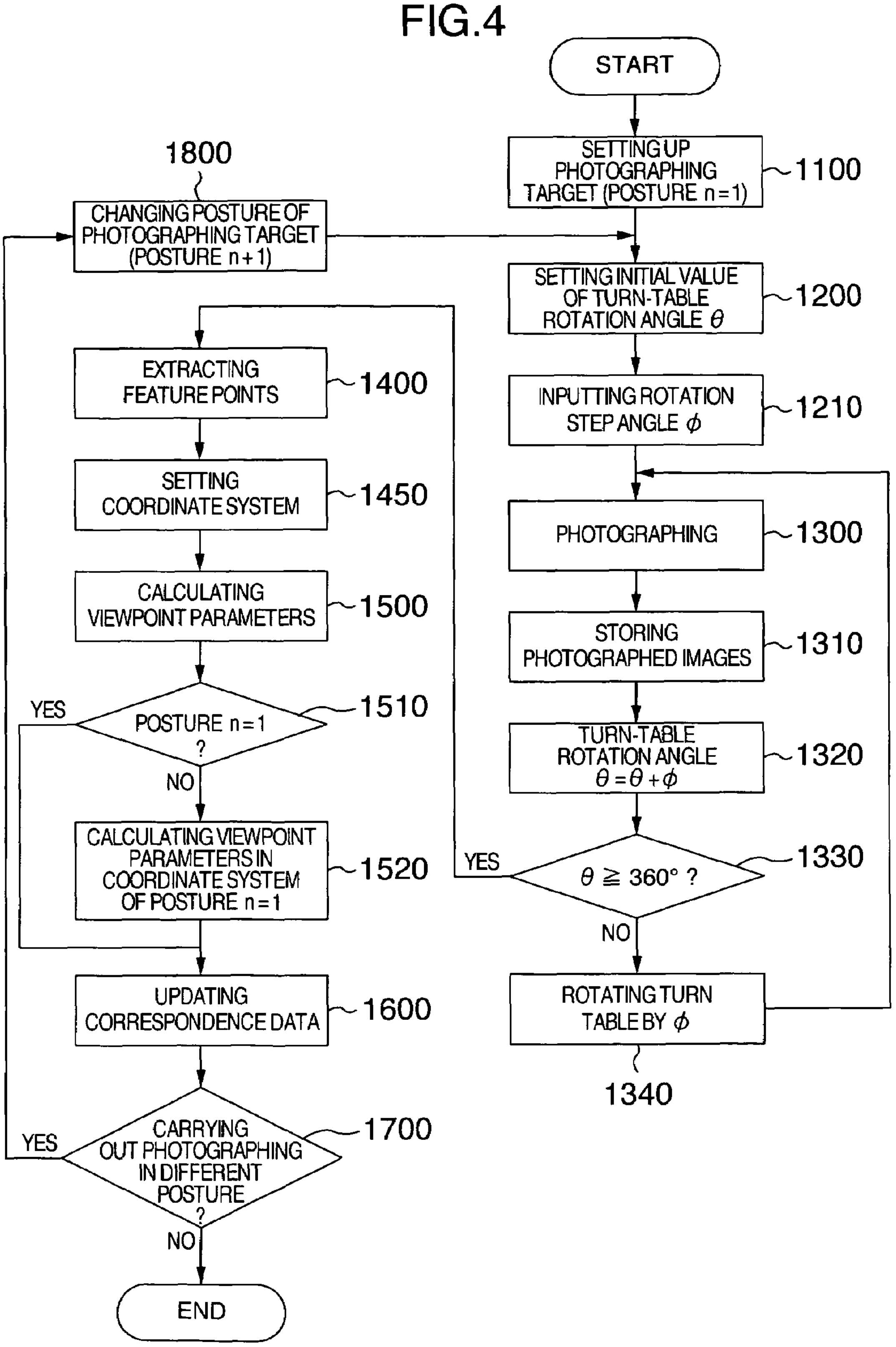
FIG. 4 is a diagram for illustrating a flowchart relating to the photographing.

FIG. 4 is a diagram for illustrating a flowchart relating to the photographing. The CPU 20 reads the earlier-described programs from the storage device 200 into the main storage device 100 to execute the programs, thereby performing the following processings: Incidentally, steps 1100 to 1210, 1700, and 1800 are processings performed by human-handed operation. Also, as explained earlier, steps 1400 and 1450 are performed by human-handed operation in some cases.

At first, posture of the photographing target 1 is set into a posture 1 (step 1100). Then, initial value (e.g., 0°) of the turn-table rotation angle $\theta$ is set (step 1200), then inputting the rotation step angle $\phi$ (step 1210).

Next, the CPU 20 carries out photographing of the photographing target 1 (step 1300), then storing photographed images into the storage device 200 (step 1310). Here, in order to acquire the photographed images with an equal spacing, it is desirable to set $\phi$ as being a submultiple of 360°.

Still next, the rotation step angle $\phi$ is added to the turn-table rotation angle $\theta$ (step 1320), then judging whether or not the turn table has been rotated by 360° (step 1330). If value of $\theta$ is found to be smaller than 360°, the turn table will be further rotated by $\phi$ (step 1340). Then, in order to photograph again the photographing target 1 after having been rotated, the processing returns to the step 1300. Hereinafter, until the turn table has been rotated by 360°, the photographing, the storage, and the turn-table rotation will be repeated.

If the value of $\theta$ is found to be larger than 360°, the CPU terminates the photographing in the posture 1 of the photographing target 1, then transferring to a step 1400.

The processing explained so far has made it possible to photograph horizontal-direction-360-° and vertical-direction-180-° images in the posture 1 of the photographing target 1. Next, a plurality of positions which will become feature points on the photographed images are extracted (step 1400). Moreover, a coordinate system is set based on the feature points extracted (step 1450), then calculating viewpoint parameters in all of the images in the set coordinate system (step 1500). Furthermore, the correspondence data 240 will be updated sequentially into the storage device 200.

Next, it is judged whether or not the calculated viewpoint parameters belong to the posture 1 (step 1510). If the viewpoint parameters are found to belong to the posture 1, the CPU proceeds to a step 1600 directly, then updating the correspondence data. Meanwhile, if the viewpoint parameters are not found to belong to the posture 1, the CPU creates viewpoint parameters in a coordinate system of the posture 1 (step 1520), then proceeding to the step 1600.

Figure 5A:
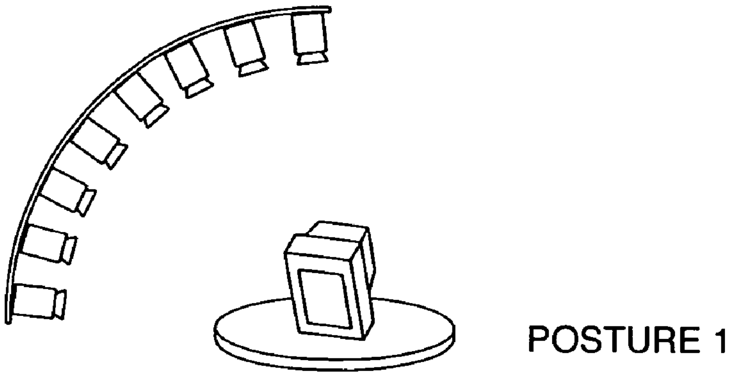
FIG. 5A to FIG. 5C are diagrams for illustrating examples of postures of the photographing target.
Figure 5B:
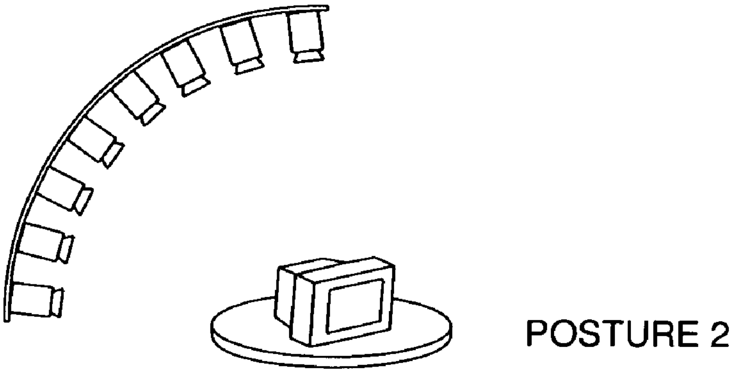
Figure 5C:
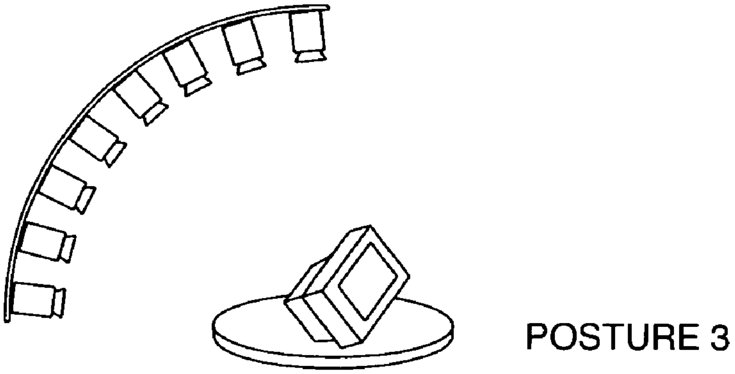

Next, it is judged whether or not the photographing in a different posture is to be carried out (step 1700). Then, if the posture has been changed (step 1800), the processing returns to the step 1200. Meanwhile, if changing the posture is judged to be unnecessary (step 1700), the CPU terminates the processing. Here, this posture change is allowed to be arbitrary as shown by a posture 1 in FIG. 5A, a posture 2 in FIG. 5B, and a posture 3 in FIG. 5C. It is desirable, however, that the photographing target 1 be positioned in the vicinity of the center of the turn table. This should be performed in order to make the distances between the photographing target 1 and all the photographing devices 40 as short as possible. Incidentally, at the step 1700, the computer 10 may be equipped with a function of prompting humans to change the posture. Also, the computer 10 may be equipped with a program of making the judgment as to whether or not the posture is to be changed.

Figure 6:
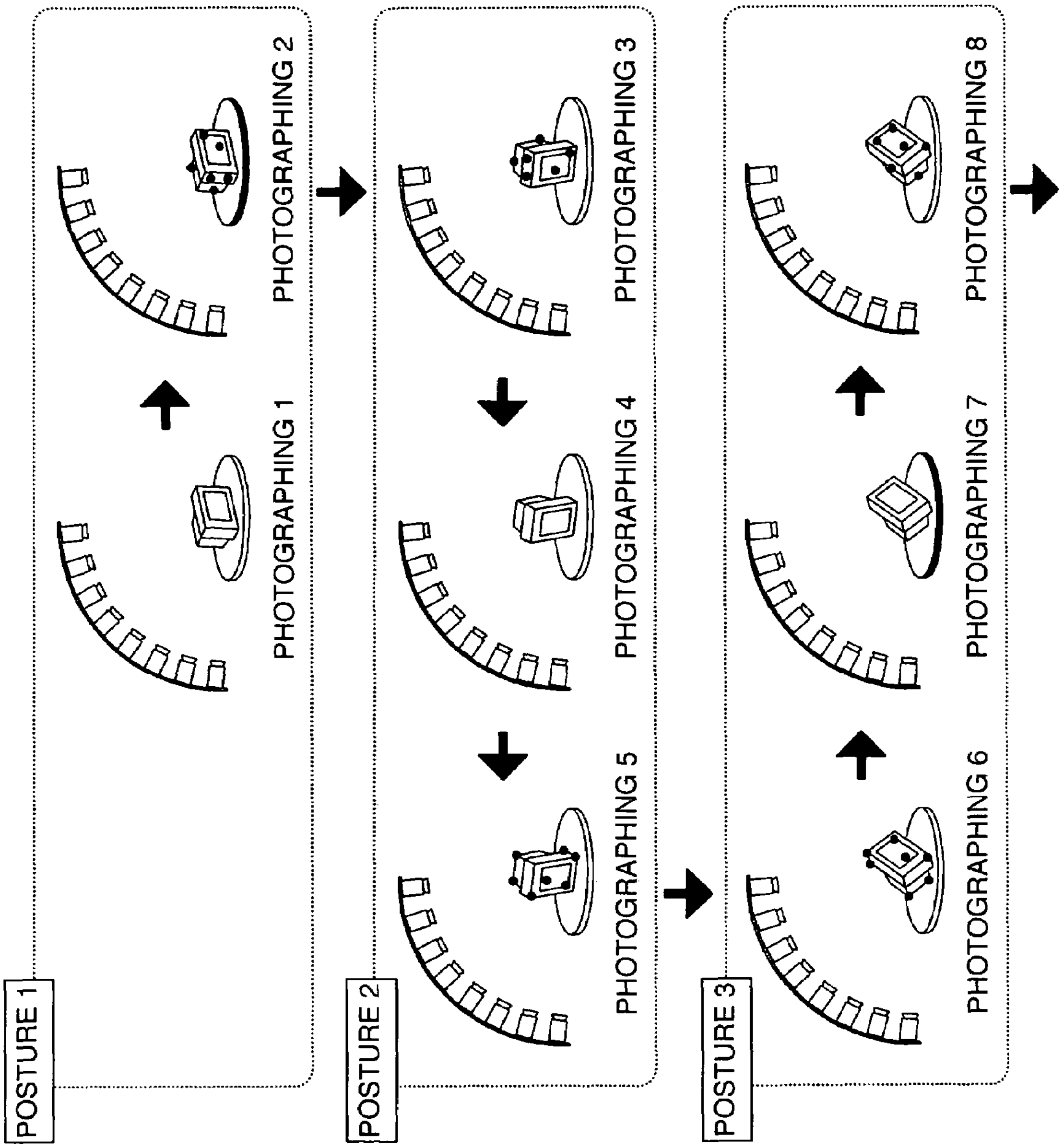
FIG. 6 is a diagram for illustrating photographing steps at the time when a plurality of markers are pasted.

FIG. 6 is a diagram for illustrating photographing steps at the time when a plurality of markers which will become feature points are pasted on a photographing target.

In extracting feature points of a photographing target, no problem will occur if there exist easy-to-distinguish feature points on the photographing target such as patterns or corners thereon. However, if a photographing target is used whose feature points are difficult to distinguish, or if the feature points are wished to be made clearer, a method is used which pastes a plurality of markers on the photographing target.

In a photographing 1, photographing of the photographing target in the state of the posture 1 is performed by the amount of horizontal 360° (i.e., one-rotation amount of the turn table).

In a photographing 2, markers are pasted at several locations on the photographing target. Then, in the state where the markers are pasted on the photographing target, the photographing of the photographing target in the state of the posture 1 is performed by the amount of horizontal 360°.

In a photographing 3, with no change added to the pasted markers, the posture of the photographing target is changed from the posture 1 to a posture 2. Then, in the state where the markers are pasted thereon, the photographing of the photographing target in the posture 2 is performed by the amount of horizontal 360°.

In a photographing 4, with the pasted markers deleted, the photographing of the photographing target in the posture 2 is performed by the amount of horizontal 360°.

In a photographing 5, the markers are pasted at several locations on the photographing target once again. Then, in the state where the markers are pasted thereon, the photographing of the photographing target in the posture 2 is performed by the amount of horizontal 360°. At this time, pasting locations of the markers may differ from the marker positions in the photographing 2 or the photographing 3.

In a photographing 6, with no change added to the pasted markers, the posture of the photographing target is changed from the posture 2 to a posture 3. Then, in the state where the markers are pasted thereon, the photographing of the photographing target in the posture 3 is performed by the amount of horizontal 360°.

In a photographing 7, with the pasted markers deleted, the photographing of the photographing target in the posture 3 is performed by the amount of horizontal 360°.

In a photographing 8, the markers are pasted at several locations on the photographing target once again. Then, in the state where the markers are pasted thereon, the photographing of the photographing target in the posture 3 is performed by the amount of horizontal 360°. At this time, pasting locations of the markers may differ from the marker positions in the photographing 2 or the photographing 3, and the photographing 5 or the photographing 6.

Hereinafter, the photographing of the photographing target in the state where the markers are pasted thereon, and that of the photographing target in the state where no markers are pasted thereon will be sequentially carried out while changing the posture of the photographing target.

Figure 7:
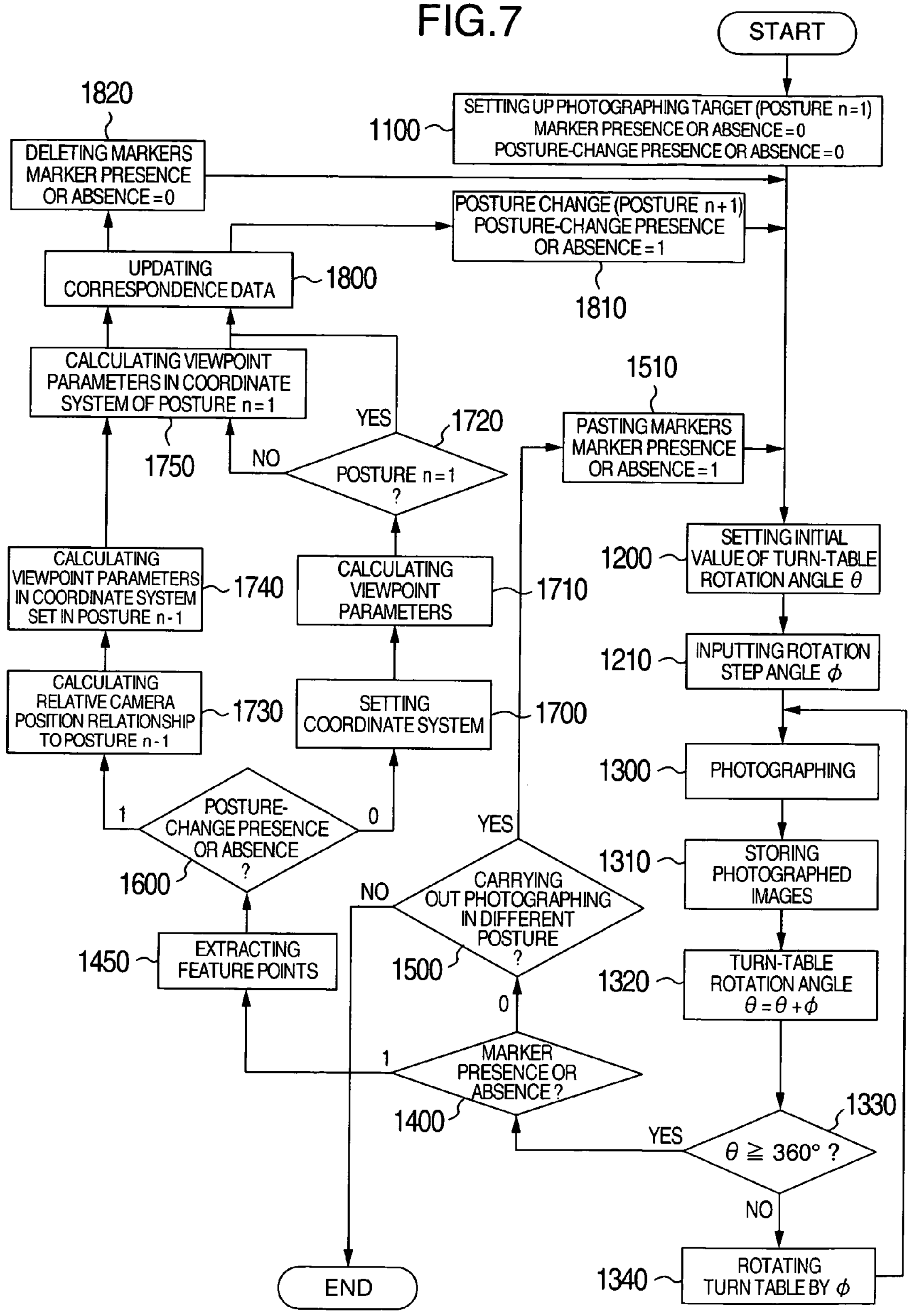
FIG. 7 is a diagram for illustrating a flowchart relating to the photographing at the time when the markers are used.

FIG. 7 is a diagram for illustrating a flowchart relating to the photographing at the time when the markers are used.

Processings at steps 1100 to 1330 are basically the same as those illustrated in FIG. 4. These processings, however, differ therefrom in the following point: Namely, at the step 1100, "marker presence or absence" is set at 0, and "posture-change presence or absence" is also set at 0. Incidentally, the state where the markers are absent is represented by "marker presence or absence=0", the state where the markers are present is represented by "marker presence or absence=1", the state where the posture of the photographing target is not changed is represented by "posture-change presence or absence=0", and the state where the posture of the photographing target has been changed is represented by "posture-change presence or absence=1". Also, the steps 1100 to 1210, part of a step 1450, and steps 1500, 1510, 1700, 1810, and 1820 are processings performed by human-handed operation.

In the case of "Yes" at the step 1330, the presence or absence of the markers is judged (step 1400). Then, in the case of "marker presence or absence=0", the processing proceeds to the step 1500. Meanwhile, in the case of "marker presence or absence=1", the processing proceeds to the step 1450.

If it is judged that the photographing is to be carried out in a different posture (step 1500), this state, namely, is the one where the photographing 1, 4, or 7 in FIG. 6 has been carried out. If it is judged that the photographing is to be carried out in the different posture, a plurality of markers are pasted at arbitrary positions on the photographing target. Accordingly, "marker presence or absence=0" is changed to "marker presence or absence=1" (step 1510), and the processing returns to the step 1200. Then, at the steps 1200 to 1340, the photographing target in the state where the markers are pasted thereon is photographed without changing the photographing-target posture.

Meanwhile, if it is judged that the markers have been pasted on the photographing target (step 1400), feature points are extracted from the photographed images (step 1450). Then, it is judged whether or not the posture change has been performed (step 1600). In the case of "posture-change presence or absence=0", namely, in the case of the state where the photographing 2 or 5 in FIG. 6 has been carried out, setting of a coordinate system is performed based on the feature points extracted (step 1700). Then, viewpoint parameters are calculated based on the set coordinate system (step 1710). Concretely, the viewpoint parameters are calculated from positions at which the same feature points on the images of the adjacent photographing device are displayed and the camera parameters stored in the respective photographing devices. Next, it is judged whether or not the calculated viewpoint parameters belong to the photographing-target posture n=1 (step 1720). In the case of "Yes", the correspondence data 240 is updated (step 1800). In the case of "No", viewpoint parameters in a coordinate system of the posture n=1 are calculated (step 1750). At this time, the data on the viewpoint parameters are calculated from the photographed images on which the photographing target with the markers pasted thereon is photographed. Here, it is assumed that photographed images which become the pair with the viewpoint parameters are the photographed images which are photographed at one step before and on which the photographing target with no markers pasted thereon is photographed. Namely, it turns out that the viewpoint parameters are created from the images acquired at the photographing 2 or 5 in FIG. 6, whereas the photographed images which become the pair therewith are the images acquired at the photographing 1 or 4 in FIG. 6.

Next, the photographing target is changed into an arbitrary posture, and thus 1 is added to the photographing-target posture n. Accordingly, "posture-change presence or absence=0" is changed to "posture-change presence or absence=1" (step 1810), and the processing returns to the step 1200. Then, at the steps 1200 to 1340, photographing of the photographing target is carried out whose photographing-target posture has been changed and which is in the state where the markers are pasted thereon.

Meanwhile, at the step 1600, if it is judged that the posture change has been performed, i.e., in the case of the state where the photographing 3 or 6 in FIG. 6 has been carried out, from the images photographed in the posture at one step before and at the same maker positions, relative camera position relationship to the posture at one step before is calculated (step 1730). Next, viewpoint parameters in a coordinate system are calculated (step 1740). Here, this coordinate system is set based on the images photographed in the posture at one step before, i.e., the images acquired at the photographing 2 or 5 in FIG. 6. Moreover, from the difference between the coordinate system of the posture at one step before and the coordinate system of the posture n=1, the viewpoint parameters in the coordinate system of the posture n=1 are calculated (step 1750). Then, the correspondence data 240 is updated (step 1800). At this time, the data on the viewpoint parameters are calculated from the photographed images on which the photographing target with the markers pasted thereon is photographed. Here, it is assumed that photographed images which become the pair with the viewpoint parameters are photographed images which will be photographed at one step after and on which the photographing target with no markers pasted thereon is photographed. Namely, it turns out that the viewpoint parameters are created from the images acquired at the photographing 3 or 6 in FIG. 6, whereas the photographed images which become the pair therewith are the images acquired at the photographing 4 or 7 in FIG. 6.

Next, the markers pasted on the photographing target are deleted all. Accordingly, "marker presence or absence=1" is changed to "marker presence or absence=0" (step 1820), and the processing returns to the step 1200. Then, at the steps 1200 to 1340, photographing of the photographing target is carried out whose photographing-target posture is not changed and which is in the state where no markers are pasted thereon.

The processings explained so far will be carried out until the selection of carrying out the photographing in a different posture has been stopped at the step 1500. Then, at the time when it has been selected not to carry out the photographing in the different posture, all the processings will be terminated.

Figure 8:
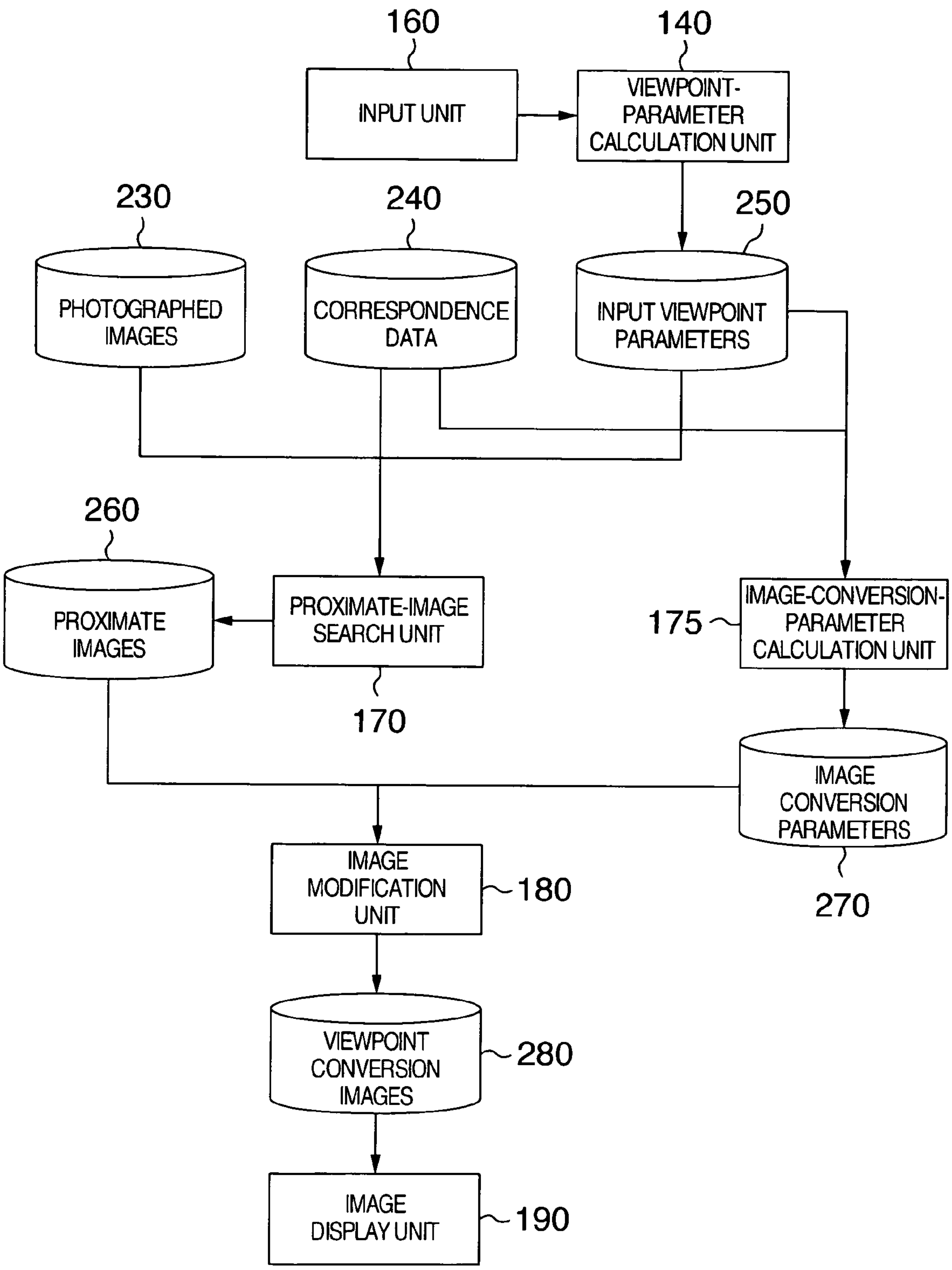
FIG. 8 is a diagram for illustrating function modules at the time of the display.

FIG. 8 is a diagram for illustrating function modules at the time of the display.

The input data acquired in the input unit 160 are converted into the input viewpoint parameters 250. Based on the viewpoint parameters included in the correspondence data 240 and the input viewpoint parameters 250, the proximate-image search unit 170 searches for viewpoint parameters within the correspondence data 240 which are the most approximate to the input viewpoint parameters 250. Then, the unit 170 determines the photographed images 230 which are paired with the viewpoint parameters selected, thereby defining the photographed images 230 as the proximate images 260. Also, simultaneously, in order to reduce the differences between the viewpoint parameters paired with the proximate images 260 and the input viewpoint parameters 250, based on the input viewpoint parameters 250 and the viewpoint parameters included in the correspondence data 240, the image-conversion-parameter calculation unit 175 calculates the image conversion parameters 270 for correcting the differences between the these viewpoint parameters. Moreover, based on the image conversion parameters 270 calculated here and the proximate images 260, the image modification unit 180 creates the viewpoint conversion images 280, then displaying the images 280 on the display device 70. These tasks are repeated and displayed every time the input data are changed. This makes it possible to freely observe the photographing-target images in desired directions.

Incidentally, the functions implemented by the programs explained in the present application may also be implemented by hardware. Also, these programs may be transferred from storage media such as a CD-ROM, or may be downloaded from some other device via a network.

The present patent application allows acquisition of the entire-surroundings images based on actual photographing. This makes it conceivable to take advantage of the present application in various types of industries, such as industrial fields which perform confirmation of parts or the like, amusement fields which provide contents allowing free viewpoint displacement or the like, and design fields which review designs of a variety of products such as automobiles and furniture.

According to the present patent application, it becomes possible to acquire the images of an actually-existing object which is seen from directions of 360°. Simultaneously, this acquisition is made executable without performing troublesome tasks in the image processing such as set up of the photographing target and set up of cameras.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A computer connected to a plurality of photographing devices and a turn table on which a photographing target is set up, said computer comprising:

a turn-table control unit for rotating said turn table on the basis of a rotation angle inputted, a photographing unit for performing a photographing every time said turn table is rotated, and acquiring images of said photographing target from said plurality of photographing devices, a coordinate-system setting unit for setting a coordinate system, position of an extracted feature point of said photographing target being defined as reference of said coordinate system, a viewpoint-parameter calculation unit for calculating viewpoint parameters on the basis of said coordinate system set by said coordinate-system setting unit and camera parameters including focal lengths and set-up positions of said photographing devices, said viewpoint parameters including position data for indicating said position coordinates of said photographing devices and direction data for indicating directions in which said photographing devices are oriented, and a correspondence-data storage unit for storing said images and said viewpoint parameters in a manner of being made correlated with each other, said images being acquired by said photographing unit, said viewpoint parameters being calculated by said viewpoint-parameter calculation unit, wherein said photographing unit photographs a first posture and a second posture of said photographing target, said coordinate-system setting unit setting a first coordinate system in said first posture and a second coordinate system in said second posture, said viewpoint-parameter calculation unit converting a viewpoint parameter in said second coordinate system into a viewpoint parameter in said first coordinate system on the basis of a difference between said first coordinate system and said second coordinate system.

2. The computer according to claim 1, wherein said plurality of photographing devices are located along a circle which is perpendicular to said turn table.

3. The computer according to claim 2, wherein said plurality of photographing devices are located with an equal spacing set therebetween.

4. The computer according to claim 3, wherein said photographing target is set up at the center of said turn table.

5. The computer according to claim 1, further comprising:

a feature-point extraction unit for extracting said feature point of said photographing target, wherein said coordinate-system setting unit sets said coordinate system with said position of said feature point defined as said reference, said feature point being extracted by said feature-point extraction unit.

6. The computer according to claim 5, wherein said feature-point extraction unit extracts a marker as said feature point, said marker being pasted on said photographing target.

7. The computer according to claim 6, wherein said photographing unit photographs said first posture in a state where no marker is pasted thereon, and defines an image of said first posture as a first image, photographs said first posture in a state where said marker is pasted thereon, and defines an image of said first posture as a second image, photographs said second posture in a state where said marker is pasted thereon, and defines an image of said second posture as a third image, and photographs said second posture in a state where said marker is deleted therefrom, and defines an image of said second posture as a fourth image, said viewpoint-parameter calculation unit calculating a first viewpoint parameter on the basis of said second image, said first coordinate system, and position relationship between said photographing devices and said marker, calculating a second viewpoint parameter on the basis of said third image, said second coordinate system, and said position relationship between said photographing devices and said marker, calculating said difference between said first coordinate system and said second coordinate system on the basis of said first viewpoint parameter and said second viewpoint parameter, and converting said second viewpoint parameter into said viewpoint parameter in said first coordinate system on the basis of said difference between said first coordinate system and said second coordinate system.

8. The computer according to claim 7, wherein said photographing unit acquires said first image to said fourth image at a plurality of times, said viewpoint-parameter calculation unit calculating said first viewpoint parameter and said second viewpoint parameter at a plurality of times, said correspondence-data storage unit storing, at a plurality of times, said first image and said first viewpoint parameter in a manner of being made correlated with each other, and said fourth image and said second viewpoint parameter in a manner of being made correlated with each other.

9. The computer according to claim 1, further comprising:

an input-data conversion unit for converting input data into a first viewpoint parameter, a proximate-image search unit for searching for a second viewpoint parameter, and selecting a proximate image corresponding to said second viewpoint parameter, said second viewpoint parameter including position data which, of position data included in a plurality of viewpoint parameters, is highly correlated with position data included in said first viewpoint parameter, said plurality of viewpoint parameters being stored in said correspondence-data storage unit, an image-conversion-parameter calculation unit for calculating an image conversion parameter, said image conversion parameter being used for correcting differences between said position data and direction data included in said first viewpoint parameter and said position data and direction data included in said second viewpoint parameter, an image modification unit for modifying said proximate image on the basis of said image conversion parameter, and storing said modified proximate image as a viewpoint conversion image, said image conversion parameter being calculated by said image-conversion-parameter calculation unit, and a display unit for displaying said viewpoint conversion image.

* * * * *